(12) United States Patent
Kim et al.

(10) Patent No.: US 11,238,405 B2
(45) Date of Patent: Feb. 1, 2022

(54) ELECTRONIC APPARATUS AND OPERATION METHOD THEREOF

(71) Applicant: Coupang Corp., Seoul (KR)

(72) Inventors: Da Young Kim, Seoul (KR); Sang Min Jun, Seoul (KR); Jin Won Jeong, Seoul (KR); Kyeong Suk Jin, Seoul (KR); Woo Jung Park, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/022,557

(22) Filed: Sep. 16, 2020

(65) Prior Publication Data

US 2021/0256460 A1    Aug. 19, 2021

(30) Foreign Application Priority Data

Feb. 17, 2020  (KR) .................. 10-2020-0019060

(51) Int. Cl.
| | |
|---|---|
| *G06Q 10/08* | (2012.01) |
| *G06F 3/0484* | (2013.01) |
| *G06K 7/14* | (2006.01) |
| *G06Q 10/06* | (2012.01) |
| *G06Q 10/00* | (2012.01) |

(52) U.S. Cl.
CPC ....... *G06Q 10/087* (2013.01); *G06F 3/04842* (2013.01); *G06K 7/1413* (2013.01); *G06Q 10/06315* (2013.01); *G06Q 10/30* (2013.01)

(58) Field of Classification Search
CPC .......... G06Q 10/087; G06Q 10/06315; G06Q 10/30; G06K 7/1413; G06F 3/04842

USPC .......................................................... 705/28
See application file for complete search history.

(56) References Cited

U.S. PATENT DOCUMENTS

| | | | |
|---|---|---|---|
| 2003/0023493 A1* | 1/2003 | Ohashi | G06Q 20/20 705/16 |
| 2010/0174552 A1 | 7/2010 | Hawkes et al. | |
| 2020/0005202 A1* | 1/2020 | Hance | B65G 61/00 |
| 2020/0090803 A1* | 3/2020 | Kircher | G06Q 30/06 |
| 2020/0104788 A1* | 4/2020 | Shuldman | G06Q 10/087 |

FOREIGN PATENT DOCUMENTS

| | | |
|---|---|---|
| JP | 2001-019126 A | 1/2001 |
| JP | 2005-110896 A | 4/2005 |
| JP | 2006-012132 A | 1/2006 |
| JP | 2011-076385 A | 4/2011 |
| JP | 2013-037503 A | 2/2013 |
| JP | 2015-140228 A | 8/2015 |
| JP | 2019-149002 A | 9/2019 |
| KR | 20060058663 A * | 5/2006 |
| KR | 10-2015-0089795 A | 8/2015 |
| KR | 10-2015-0128343 A | 11/2015 |
| KR | 10-2017-0053424 A | 5/2017 |

* cited by examiner

*Primary Examiner* — Russell S Glass
(74) *Attorney, Agent, or Firm* — Knobbe, Martens, Olson & Bear, LLP

(57) ABSTRACT

Provided is a method of recognizing an item as a removal target based on expiration date-related information of the item, acquiring information regarding an actual quantity of the removal target and a remaining quantity among the actual quantity, and updating information regarding stock based on the acquired information, and an electronic apparatus therefor.

11 Claims, 13 Drawing Sheets

FIG. 11

| Location ID | SKU ID | Expiration/manufactured date | Quantity-on-data | Operator | Removal qty. | Remaining qty. | Completion date | Reason for error |
|---|---|---|---|---|---|---|---|---|
| 22-C3-1-1 | 20 | | 1 | zuneho | | | 2019-09-25 11:16:58 | Position not found |
| 22-A2-1-1 | 971 | 2017-12-31 | 813 | ms.song | 1 | 0 | 2019-09-25 09:29:59 | |
| 22-F1-30-101 | 20 | 2017-12-31 | 1 | ksu3101 | 3 | 0 | 2019-09-24 18:31:49 | |
| 22-F1-19-101 | 20 | 2017-12-31 | 1 | ksu3101 | | | 2019-09-24 18:15:57 | Position not found |
| 22-F1-1-101 | 82791 | 2019-02-19 | 4 | ksu3101 | | | 2019-09-24 18:14:10 | Cannot scan product barcode |
| 22-A1-1-1 | 12094 | | 144 | ksu3101 | | | 2019-09-24 16:41:47 | Position not found |

1102  1104  1106  1108  1110  1112  1114  1116

1100

ELECTRONIC APPARATUS AND OPERATION METHOD THEREOF

BACKGROUND

Technical Field

This disclosure relates to an electronic apparatus for stock management and an operation method thereof.

Description of the Related Art

In order to be delivered to customers in accordance with orders, numerous items may be stored in a fulfillment center as stock. Positions of the items may be changed due to stock transfer. Also, the number of items may be changed due to a disposal of items. Therefore, there is a desire for more accurate and efficient stock management.

SUMMARY

Technical Goals

An aspect provides an electronic apparatus and operation method thereof. Technical goals to be achieved through the example embodiments are not limited to the technical goals as described above, and other technical tasks can be inferred from the following example embodiments.

Technical Solutions

According to a first embodiment, there is provided an operation method of an electronic apparatus for stock management, the method including recognizing an item as a removal target based on expiration date-related information of the item, transmitting information on or regarding the removal target to a terminal, acquiring, from the terminal, information on a removal quantity to be removed from stock among an actual quantity of the removal target and information on a remaining quantity other than the removal quantity among the actual quantity of the removal target, and updating information on the stock based on the information on the removal quantity and the information on the remaining quantity.

According to a second embodiment, there is also provided an operation method of a terminal for stock management, the method including outputting information on an item corresponding to a removal target, acquiring information regarding a removal quantity to be removed from stock among an actual quantity of the removal target, and information on a remaining quantity other than the removal quantity among the actual quantity of the removal target, and outputting the information on the removal quantity and the information on the remaining quantity.

According to a third embodiment, there is also provided an electronic apparatus for stock management, the apparatus including a communication device and a controller, wherein the controller is configured to recognize an item as a removal target based on expiration date-related information of the item, transmit information on the removal target through the communication device to a terminal, acquire information regarding a removal quantity to be removed from stock among an actual quantity of the removal target and information on a remaining quantity other than the removal quantity among the actual quantity of the removal target, from the terminal through the communication device, and update information on the stock based on the information on the removal quantity and the information on the remaining quantity.

According to a fourth embodiment, there is also provided a non-volatile computer-readable recording medium including a computer program for performing the above-described method.

Specific details of example embodiments are included in the detailed description and drawings.

Effects

According to example embodiments, it is possible to provide an electronic apparatus that determines whether an item is a removal target in response to an occurrence of a predetermined condition such as a case in which a management type of the item is changed and updates information on or regarding stock based on information on a removal quantity and a remaining quantity of the item corresponding to the removal target, thereby managing the stock more accurately and efficiently.

Effects are not limited to the aforementioned effects, and other effects not mentioned will be clearly understood by those skilled in the art from the description of the claims.

BRIEF DESCRIPTION OF THE DRAWINGS

FIG. 11 illustrates an electronic apparatus displaying information on stock according to an example embodiment.

DETAILED DESCRIPTION

The terms used in the embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may include the following meanings: A alone; B alone; C alone; both A and B together; both A and C together; both B and C together; and all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

Figure 1:
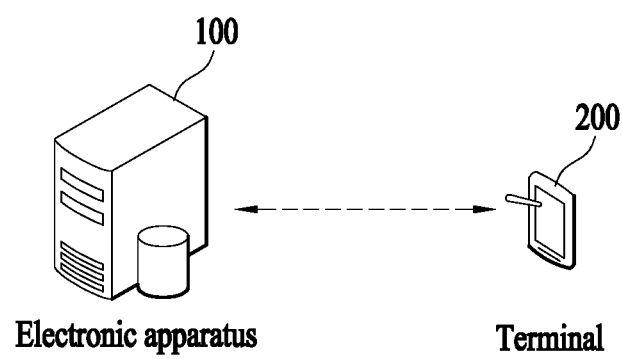
FIG. 1 illustrates a system for stock management according to an example embodiment.

FIG. 1 illustrates a system for stock management according to an example embodiment.

Referring to FIG. 1, a system 1 for stock management may include an electronic apparatus 100 and a terminal 200. FIG. 1 illustrates only components of the system 1 related to the present embodiment. However, it is obvious to those skilled in the art that other general-purpose components may be further included in the system 1 in addition to the components illustrated in FIG. 1.

The electronic apparatus 100 and the terminal 200 may communicate with each other in a network. The network may include any one or combinations of a local area network (LAN), a wide area network (WAN), a value added network (VAN), a mobile radio communication network, and a satellite communications network. Also, the network is a comprehensive data communication network that allows network components to smoothly communicate with each other, and may include a wired Internet, a wireless Internet, and a mobile wireless communication network. The wireless communication may be, for example, wireless fidelity (Wi-Fi) LAN, Bluetooth™, Bluetooth low energy, ZigBee, Wi-Fi direct (WFD), ultra wideband (UWB), infrared Data Association (IrDA) communication, and near field communication (NFC) but not is limited thereto.

The electronic apparatus 100 may manage stock of a fulfillment center. Specifically, items to be delivered to customers in accordance with orders may be stored in the fulfillment center as the stock. The electronic apparatus 100 may store information on or regarding the stock in a database. For example, the electronic apparatus 100 may store information on a position, a status, or a quantity of each item in the database. Also, the electronic apparatus 100 may monitor the information on the stock and update the information on the stock based on a change in stock. For example, when a position of an item is changed due to a stock transfer, or when a quantity of the item is changed due to a disposal of the item, the electronic apparatus 100 may update the information on the stock. The electronic apparatus 100 may be included in a warehouse management system.

The electronic apparatus 100 may transmit a work command associated with the stock to the terminal 200. For example, the electronic apparatus 100 may transmit a work command for relocating an item or a work command for removing an item to the terminal 200. Also, the electronic apparatus 100 may receive a work result from the terminal 200 and update the information on the stock based on the work result. The terminal 200 may be a terminal carried by an operator.

The electronic apparatus 100 may recognize a target to be removed (hereinafter, also be referred to as a "removal target") from the stock based on expiration date-related information. Specifically, the electronic apparatus 100 may recognize an item of which an expiration date has passed or is imminent, as a target to be removed from the stock based on expiration date-related information of each item. The electronic apparatus 100 may transmit a work command to remove the removal target from the stock to the terminal 200. The electronic apparatus 100 may receive a removal result of the removal target from the terminal 200 and update the information regarding the stock based on the removal result.

The electronic apparatus 100 may provide a platform for a stock management service. Specifically, the electronic apparatus 100 may provide an application for the stock management service to the terminal 200. Also, the electronic apparatus 100 may execute the application and provide the stock management service through the terminal 200 connected to the electronic apparatus 100. For example, the electronic apparatus 100 may be included in a server for providing the stock management service.

Figure 2:
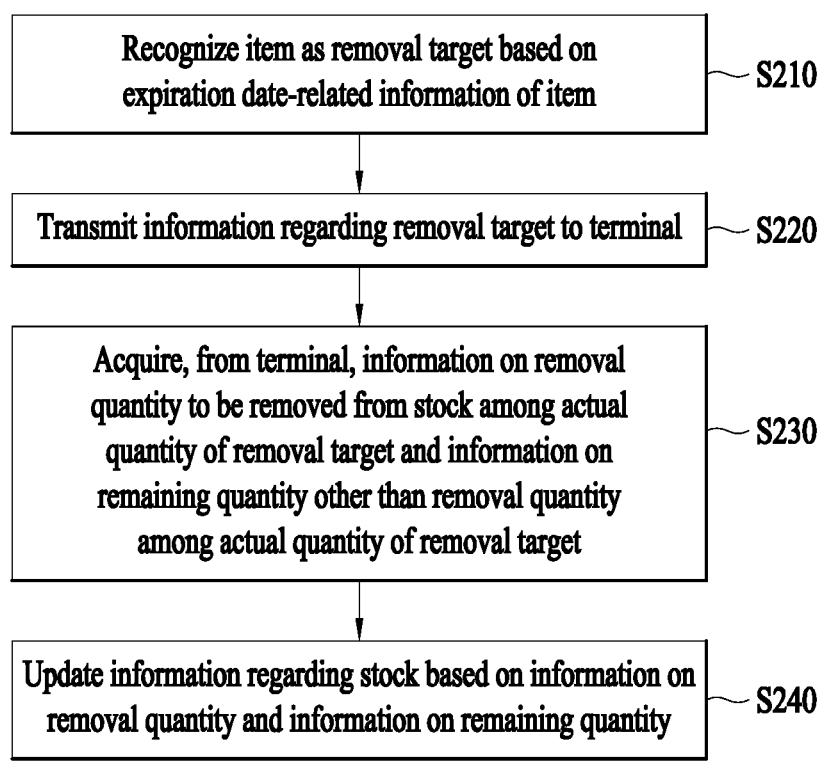
FIG. 2 illustrates an operation method of an electronic apparatus according to an example embodiment.

FIG. 2 illustrates an operation method of an electronic apparatus according to an example embodiment.

In operation S210, the electronic apparatus 100 may recognize an item as a removal target based on expiration date-related information of the item. By using the expiration date-related information, the electronic apparatus 100 may determine whether an expiration date of the item has passed or is imminent based on a current date. When an expiration date of the item has passed or is imminent based on the current date, the electronic apparatus 100 may recognize the item as a target to be removed from stock.

In the present disclosure, an item may indicate a single item, or may indicate a set of items of the same type. Also, an item may indicate a predetermined quantity of items corresponding to the same stock keeping unit (SKU). For example, an item having a specific SKU identification (ID) may indicate a predetermined quantity of items.

In an example, if the item is an item managed by expiration date, expiration date-related information of the item may include an expiration date of the item. In this example, the electronic apparatus 100 may compare the current date and the expiration date of the item. When the expiration date of the item has passed or is the current date, the electronic apparatus 100 may recognize the item as a removal target. In another example, if the item is an item managed by expiration date, expiration date-related information of the item may include an expiration date of the item and a shelf life of the item. In this example, the electronic apparatus 100 may compare a current date and a date calculated based on the shelf life and the expiration date of the item, thereby determining whether the item is a removal target. For example, the electronic apparatus 100 may compare the current date and a first date calculated by deducting the shelf life from a period remaining to the expiration date of the item. When the first date has passed or is the current date, the electronic apparatus 100 may recognize the item as the removal target. The shelf life of the item may be set based on a property of the item.

In still another example, if the item is an item managed by manufactured date, expiration date-related information of the item may include a manufactured date of the item and a shelf life of the item. In this example, the electronic apparatus 100 may compare a current date and a date calculated based on the manufactured date and the shelf life of the item, thereby determining whether the item is a removal target. For example, the electronic apparatus 100 may compare the current date and a first date calculated by adding the shelf life to the manufactured date of the item. When the first date has passed or is as the current date, the electronic apparatus 100 may recognize the item as the removal target. The shelf life of the item may be set based on a property of the item.

When the expiration date-related information of the item is absent, the electronic apparatus 100 may recognize the item as the removal target. For example, when a management type of a first item is changed from an item managed by manufactured date to an item managed by expiration date, expiration date-related information of the first item may be absent. Thus, the electronic apparatus 100 may recognize the first item as the removal target.

When the item is recognized as the removal target, the electronic apparatus 100 may recognize, as the removal target, an item of a remaining quantity excluding a customer-ordered quantity from a total quantity of the item. For example, when a total quantity of the item is four and two of the four are allocated as a customer-ordered quantity, the electronic apparatus 100 may recognize that two of the four are the removal target. As such, the electronic apparatus 100 may recognize an item of a quantity excluding the customer-ordered quantity from the total quantity of the item as the removal target. Through this, the electronic apparatus 100 may prevent an item allocated to an order from being included in the removal target, which is referred to as "out of stock (OOS) cancel."

The electronic apparatus 100 may determine whether each item of the stock is the removal target based on a predetermined point in time. For example, the electronic apparatus 100 may determine whether each item of the stock is the removal target based on 0 o'clock. Also, when a management type of an item is changed, the electronic apparatus 100 may determine whether the item is the removal target in real time. For example, when a management time of an item is changed from an item managed by expiration date to an item managed by manufactured date, the electronic apparatus 100 may compare a current date and a date calculated based on a manufactured date and a shelf life of the item, thereby determining whether the item is the removal target. Also, when expiration date-related information of the item is changed, the electronic apparatus 100 may determine whether the item is the removal target in real time. For example, when at least one of the shelf life, the manufactured date, and the expiration date of the item is changed, the electronic apparatus 100 may determine whether the item is the removal target based on the changed shelf life, manufactured date, or expiration date.

When a position of the item is changed, the electronic apparatus 100 may determine whether the item is the removal target in real time. For example, when the item is moved from a problem zone to a buffer zone or picking zone, the electronic apparatus 100 may determine whether the item is the removal target. Also, when a release of the item or an allocation due to the stock transfer is canceled, the electronic apparatus 100 may determine whether the item is the removal target in real time. For example, when an allocation due to a release is performed on the first item in accordance with a customer's order, and then the customer cancels the order, the allocation on the first item may be canceled. In response to the release being canceled, the electronic apparatus 100 may determine whether the first item is the removal target.

In operation S220, the electronic apparatus 100 may transmit, to a terminal, information on or regarding the removal target recognized in operation S210. In other words, the electronic apparatus 100 may transmit information on each item recognized as the removal target in the stock to the terminal. The information on the removal target may include at least one of identification information, position information, and removal criterion information of the removal target. The removal criterion information of the removal target may be set based on the expiration date-related information of the removal target. Also, the electronic apparatus 100 may transmit a removal task command for the removal target to the terminal.

In operation S230, the electronic apparatus 100 may acquire, from the terminal, information on a removal quantity to be removed from the stock among an actual quantity of the removal target and information on a remaining quantity other than the removal quantity among the actual quantity of the removal target. Specifically, an operator may identify an actual quantity of the item corresponding to the removal target. Among the actual quantity, the operator may input a quantity of an item of which an expiration date has passed or is imminent, to the terminal as a removal quantity. Also, among the actual quantity, the operator may input a quantity of an item having a sufficient period to the expiration date, to the terminal as a remaining quantity. Through this, from the terminal, the electronic apparatus 100 may receive information on the removal quantity and information on the remaining quantity input to the terminal.

The electronic apparatus 100 may further acquire expiration date-related information corresponding to or associated with the remaining quantity from the terminal. When the remaining quantity is one, the expiration date-related information corresponding to the remaining quantity may include the expiration date or the manufactured date of the item of the remaining quantity. When the remaining quantity is plural and the removal target is an item managed by expiration date, the expiration date-related information corresponding to the remaining quantity may include an earliest expiration date among expiration dates of items of the remaining quantity. Likewise, when the remaining quantity is plural and the removal target is an item managed by manufactured date, the expiration date-related information corresponding to the remaining quantity may include an earliest manufactured date among manufactured dates of items of the remaining quantity.

In operation S240, the electronic apparatus 100 may update the information on the stock based on the information on the removal quantity and the information on the remaining quantity acquired in operation S230. The electronic apparatus 100 may update information on a quantity-on-data of the item corresponding to the removal target in the stock. The electronic apparatus 100 may determine whether the quantity-on-data of the removal target matches the actual quantity. When the quantity-on-data of the removal target does not match the actual quantity, the electronic apparatus 100 may adjust the quantity-on-data based on the actual quantity. A related example will be further described with reference to FIG. 10.

The electronic apparatus 100 may update the expiration date-related information of the item corresponding to the removal target based on the expiration date-related information of the remaining quantity. For example, the electronic apparatus 100 may update license plate number (LPN) information of the item corresponding to the removal target based on the expiration date of the item of the remaining quantity.

As such, when a predetermined condition occurs, for example, when a management type of an item is changed, the electronic apparatus 100 may determine whether the item is a removal target and update information on stock based on information on a removal quantity and remaining quantity of the item corresponding to the removal target, thereby more efficiently and accurately managing the stock.

Figure 3:
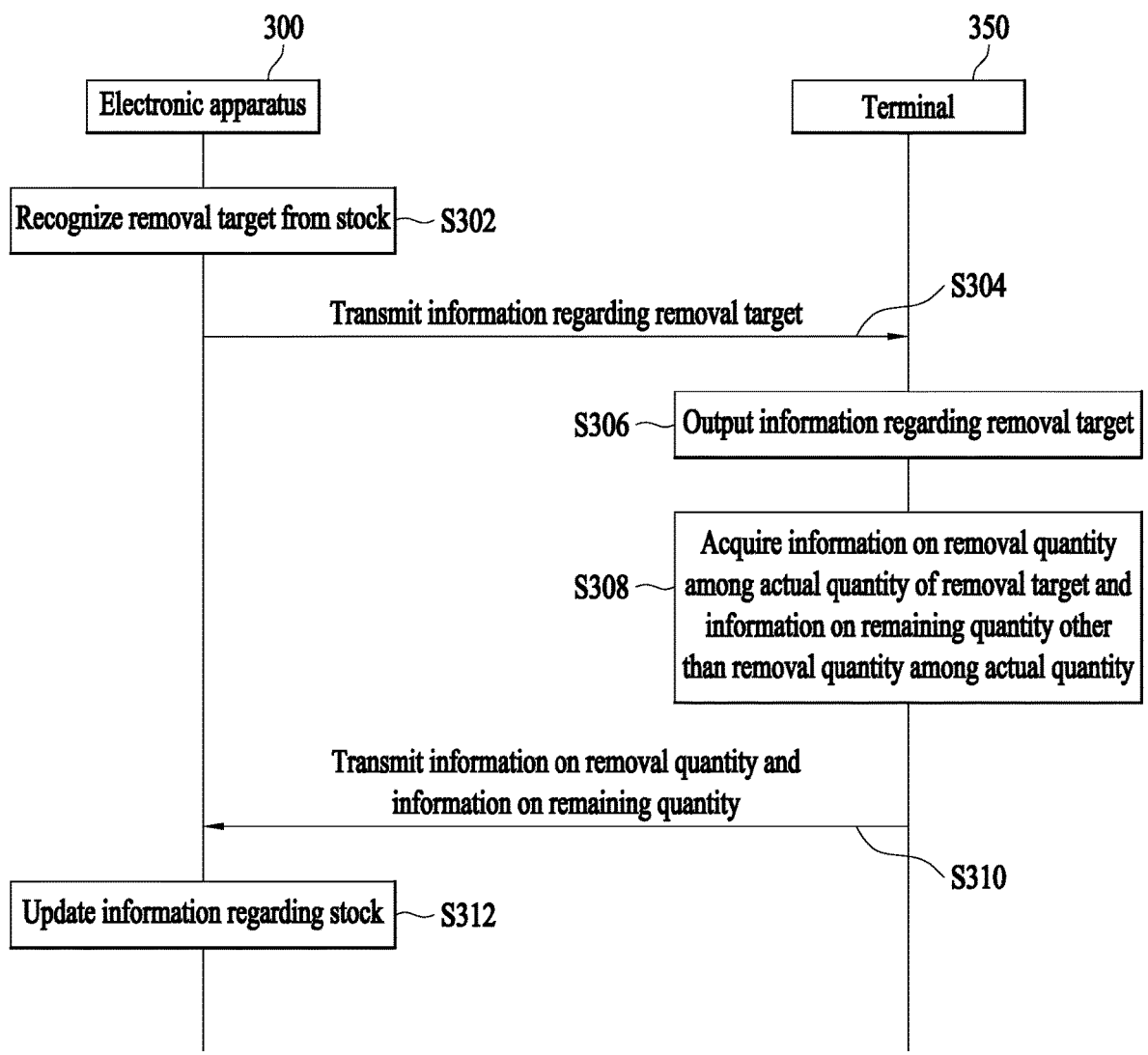
FIG. 3 illustrates an example of operating an electronic apparatus and a terminal according to an example embodiment.

FIG. 3 illustrates an example of operating an electronic apparatus and a terminal according to an example embodiment.

In operation S302, an electronic apparatus 300 may recognize a removal target from stock. Specifically, the electronic apparatus 300 may determine whether each item of the stock is a removal target due to an imminent shelf life or expiration of a shelf life based on expiration date-related information of the corresponding item. Since the description of operation S210 of FIG. 2 is also applicable to operation S302, redundant description will be omitted.

In operation S304, the electronic apparatus 300 may transmit information on the removal target to a terminal 350. Since the description of operation S220 of FIG. 2 is also applicable to operation S304, redundant description will be omitted.

In operation S306, the terminal 350 may output the information on the removal target. For example, the terminal 350 may display at least one of identification information, removal criterion information, and position information of the removal target on a display.

Figure 4:
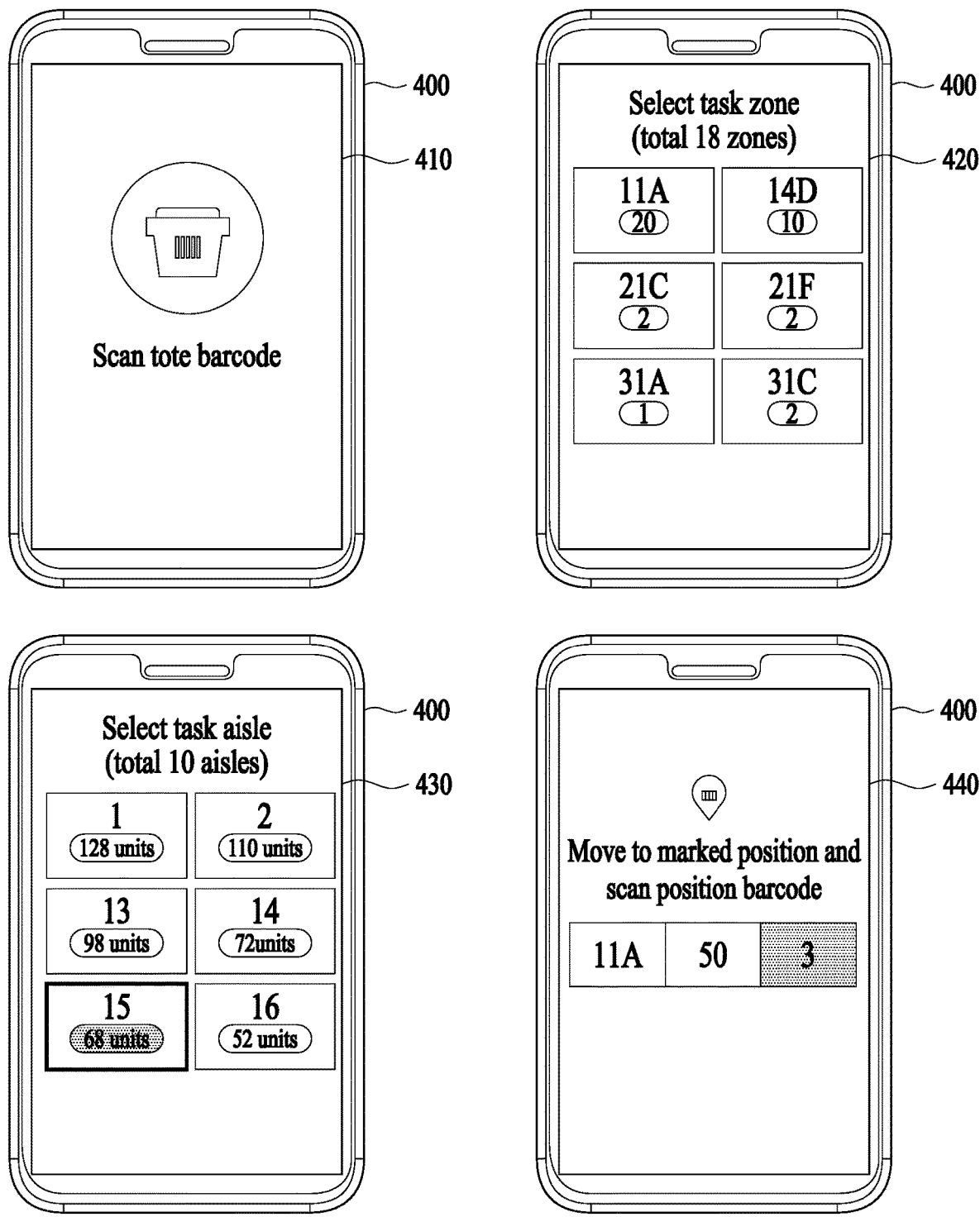
FIG. 4 illustrates a terminal outputting information regarding a removal target according to an example embodiment.

FIG. 4 illustrate a terminal outputting information regarding a removal target according to an example embodiment.

A terminal 400 may display, on a display, an image 410 for requesting an operator to scan a tote barcode.

When the operator scans the tote barcode using a scanner of the terminal 400, the terminal 400 may display, on the display, an image 420 for requesting the operator to select a zone in which a removal task is to be performed (hereinafter, also referred to as "removal working zone") and an image 430 for requesting the operator to select an aisle through which the removal task is to be performed (hereinafter, also referred to as "removal working aisle"). The operator may identify the image 420 and select the removal working zone. The terminal 400 may receive a selecting input from the operator. Also, the operator may identify the image 430 and select the removal working aisle. The terminal 400 may receive a selecting input from the operator. For example, the operator may select a working zone and a working aisle through a touch screen of the terminal 400.

When the removal working zone and the removal working aisle are selected, the terminal 400 may display, on the display, information on a position in which the operator is to perform the removal task and an image 440 for requesting the operator to scan a position barcode.

Referring back to FIG. 3, in operation S308, the terminal 350 may acquire information on a removal quantity among an actual quantity of the removal target and information on a remaining quantity other than the removal quantity among the actual quantity of the removal target.

Specifically, the operator may receive the information on the removal target through the terminal 350 and identify the item of the actual quantity corresponding to the removal target present at a predetermined position. Also, the operator may identify the removal quantity and the remaining quantity among the actual quantity based on the removal criterion information provided by the electronic apparatus 300 and input information on the removal quantity and the actual quantity to the terminal 350.

The terminal 350 may acquire expiration date-related information corresponding to the remaining quantity. Specifically, the operator may identify an expiration date or a manufactured date of an item of the remaining quantity among items of the actual quantity and input the identified expiration date or manufactured date of the item of the remaining quantity to the terminal 350. When the remaining quantity is two or more, the operator may input, to the terminal 350, an earliest date among expiration dates of items of the remaining quantity or an earliest manufactured date among manufactured dates of the items of the remaining quantity.

Figure 5:
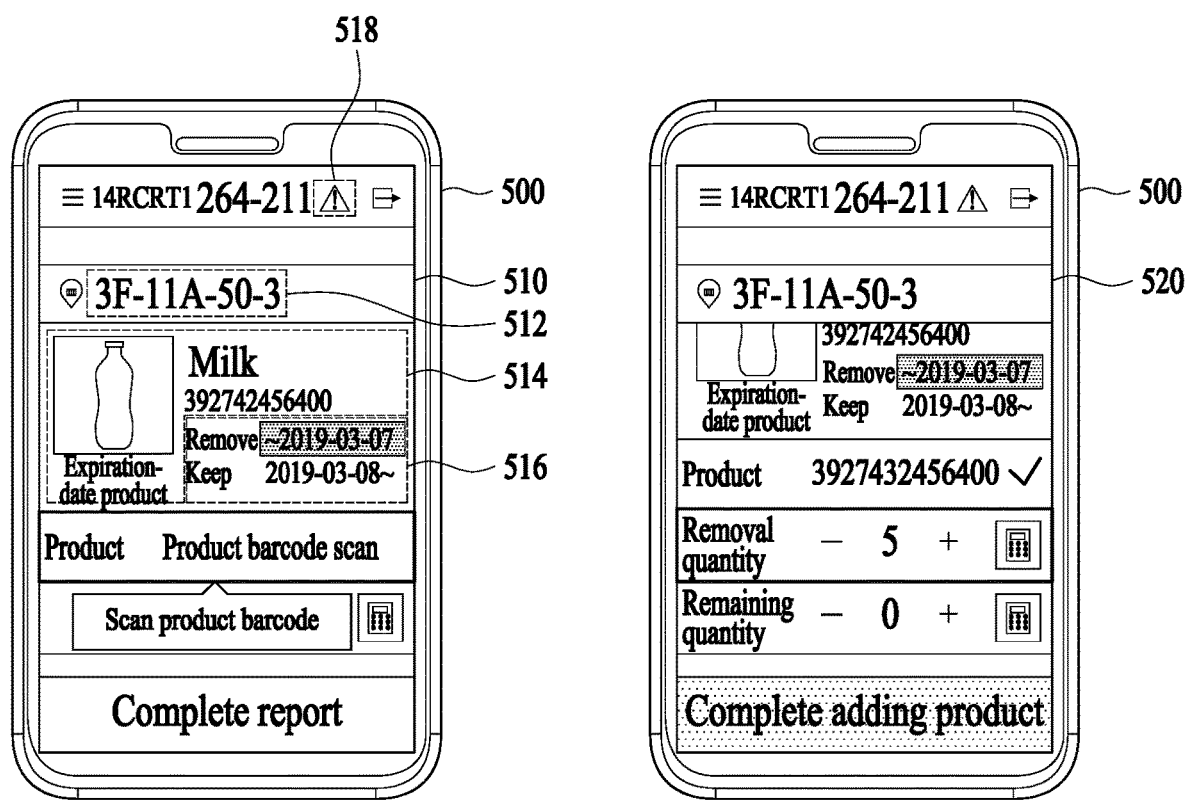
FIG. 5 illustrates a terminal acquiring information on a removal quantity and a remaining quantity according to an example embodiment.

FIG. 5 illustrates a terminal acquiring information regarding a removal quantity and information on a remaining quantity according to an example embodiment.

A terminal 500 may display, on a display, an image 510 including information on a removal target and a message for requesting a product barcode of the removal target to be scanned. The image 510 may include position information 512 of the removal target, identification information 514 of the removal target, and removal criterion information 516 of the removal target. The operator may identify the position information 512 and the identification information 514, and scan a barcode of an item corresponding to the removal target through a scanner of the terminal 500.

The terminal 500 may provide an operator with a menu 518 for reporting an occurrence of a problem related to product barcode scanning. The operator may select the menu 518 to input, to the terminal 500, a problem that a product barcode is damaged or the removal target is actually absent. Also, information on the problem input in the terminal 500 may be transmitted to an electronic apparatus.

The terminal 500 may implement a graphical user interface (GUI) through which the operator inputs a removal quantity and a remaining quantity among an actual quantity of the removal target to the terminal 500. For example, as shown by an image 520, the terminal 500 may implement a touch screen through which the removal quantity and the remaining quantity are input by the operator. The operator may identify the removal quantity and the remaining quantity among the actual quantity of the removal target based on the removal criterion information 516 and input information on the identified removal quantity and remaining quantity to the terminal 500. The removal criterion information 516 may be set based on an expiration date of the removal target.

Figure 6:
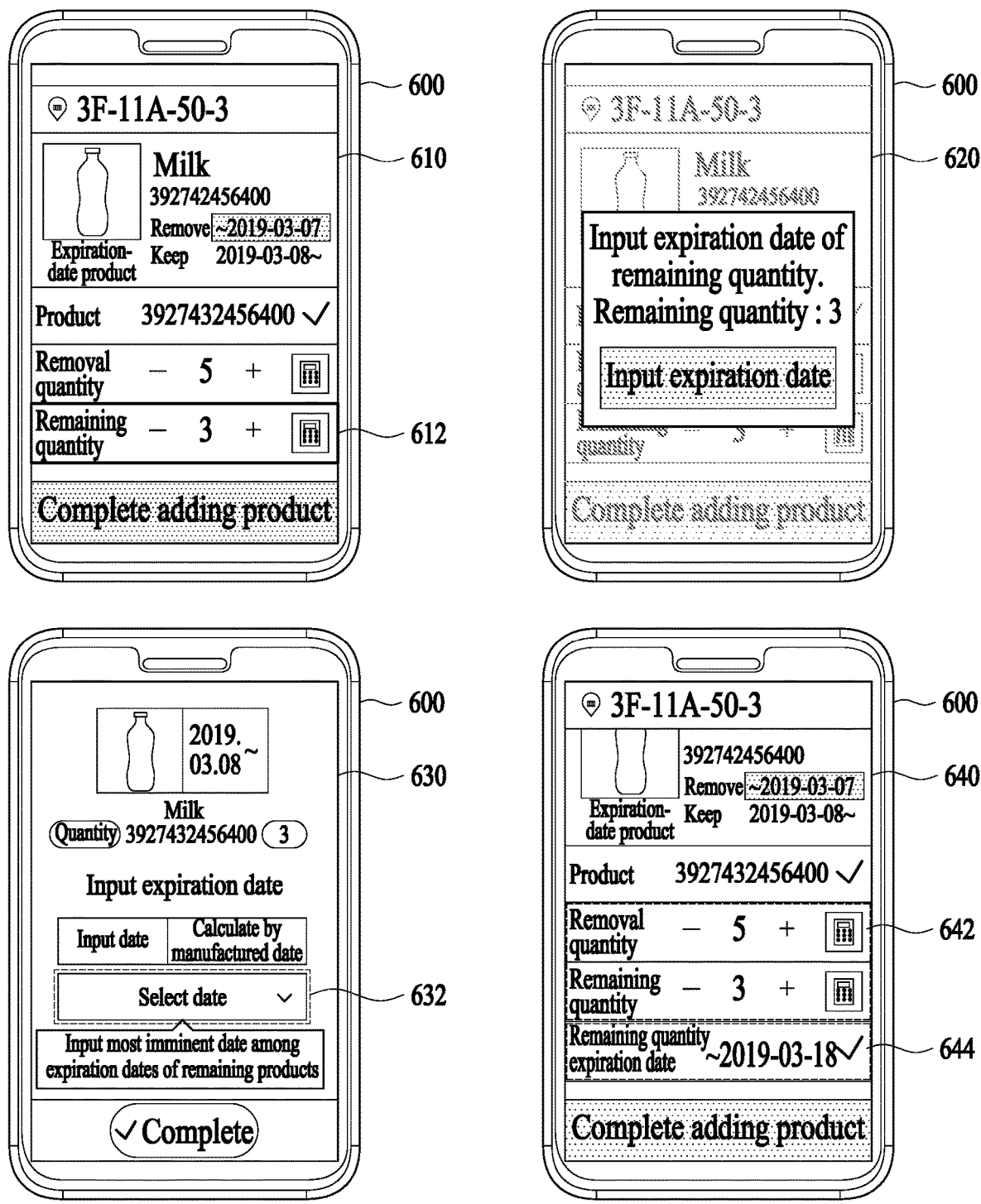
FIG. 6 illustrates a terminal acquiring expiration data-related information corresponding to a remaining quantity according to an example embodiment.

FIG. 6 illustrates a terminal acquiring expiration date-related information corresponding to a remaining quantity according to an example embodiment.

A terminal 600 may receive information on a removal quantity and a remaining quantity from an operator as shown by an image 610. Also, the terminal 600 may display an image 620 including a message for requesting an input of expiration date-related information corresponding to the remaining quantity.

The terminal 600 may implement a GUI through which the operator inputs the expiration date-related information corresponding to the remaining quantity. For example, the terminal 600 may implement a touch screen through which expiration date-related information is input by the operator as shown by an image 630. When the remaining quantity is two or more, the operator may input an earliest date among expiration dates of items of the remaining quantity to the terminal 600. For example, the operator may input the earliest date among the expiration dates of the items of the remaining quantity to the terminal 600 through a date selection menu 632 of the image 630.

When an expiration date input through the date selection menu 632 is an incorrect date, the terminal 600 may request an expiration date to be input again or request a removal quantity and a remaining quantity to be input again. For example, when an expiration date input by the operator is the same as an expiration date corresponding to a removal criterion of the removal target, the terminal 600 may request an expiration date to be input again or request a removal quantity and a remaining quantity to be input again.

Based on the input of the operator, the terminal 600 may display an image 640 including information 642 on the removal quantity and remaining quantity of the item and expiration date-related information 644 corresponding to the remaining quantity.

Figure 7:
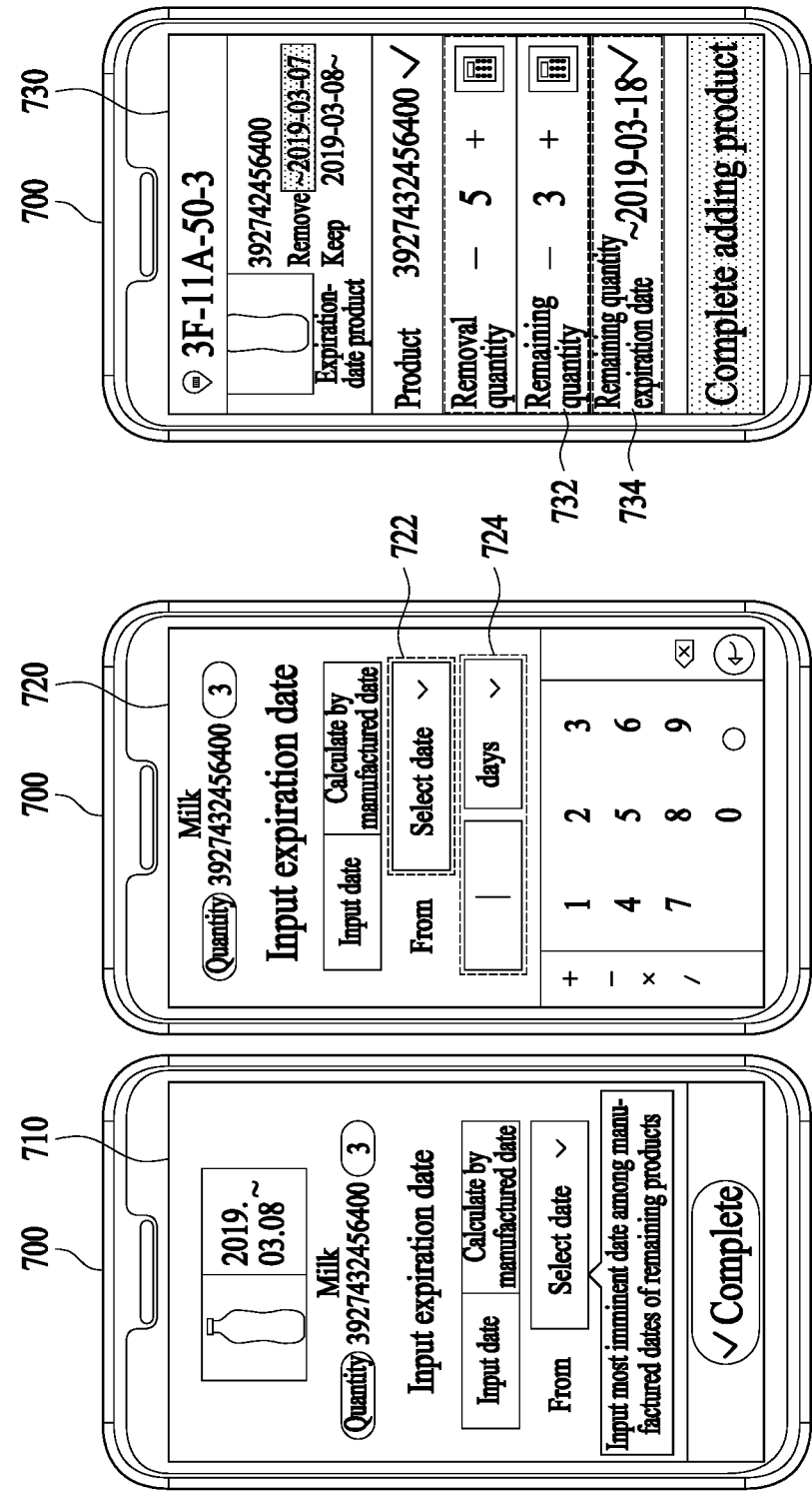
FIG. 7 illustrates a terminal acquiring expiration data-related information corresponding to a remaining quantity according to an example embodiment.

FIG. 7 illustrates a terminal acquiring expiration date-related information corresponding to or associated with a remaining quantity according to an example embodiment A terminal 700 may implement a GUI through which an operator inputs expiration date-related information. The terminal 700 may display an image 710 including a message for requesting information related to an expiration date calculated from a manufactured date to be input. For example, when a remaining quantity is two or more, the operator may input an earliest manufactured date among manufactured dates of items of the remaining quantity to the terminal 700 and input, to the terminal 700, information on a predetermined period having the earliest manufactured date as a starting point in time. For example, the operator may input, to the terminal 700, an earliest manufactured date and a recommended consumption period of an item having the earliest manufactured date through a manufactured date selection menu 722 and a period selection menu 724 of an image 720.

Based on the input of the operator, the terminal 700 may display an image 730 including information 732 on the removal quantity and remaining quantity of the item and expiration date-related information 734 corresponding to the remaining quantity. The expiration date-related information 734 corresponding to the remaining quantity may be calculated based on a predetermined period and an earliest manufactured date input by the operator to the terminal 700.

Figure 8:
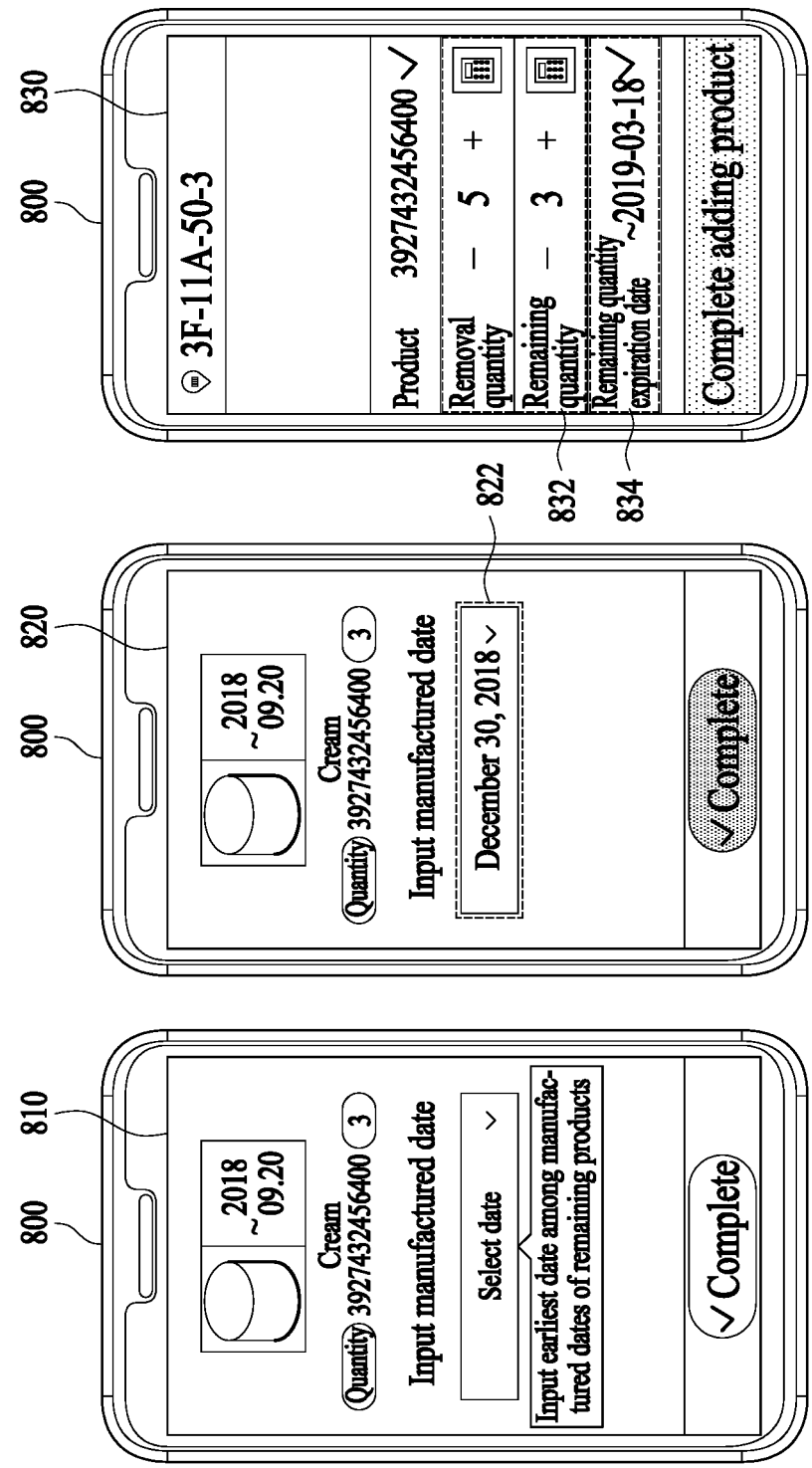
FIG. 8 illustrates a terminal acquiring expiration data-related information corresponding to a remaining quantity according to an example embodiment.

FIG. 8 illustrates a terminal acquiring expiration date-related information corresponding to a remaining quantity according to an example embodiment.

A terminal 800 may implement a GUI through which operator inputs expiration date-related information. Specifically, the terminal 800 may display an image 810 including a message for requesting information on a manufactured date to be input. When a remaining quantity is two or more, the operator may input an earliest manufactured date among manufactured dates of items of the remaining quantity to the terminal 800. For example, the operator may input, to the terminal 800, information on the earliest manufactured date, that is, Dec. 30, 2018 through a manufactured date selection menu 822 of an image 820.

Based on the input of the operator, the terminal 800 may display an image 830 including information 832 on a removal quantity and remaining quantity of an item and expiration date-related information 834 corresponding to the remaining quantity. The expiration date-related information 834 corresponding to the remaining quantity may indicate the earliest manufactured date input by the operator to the terminal 800. When the item is an item managed by manufactured date, expiration date management of the item may be based on the manufactured date of the item. Thus, the expiration date-related information corresponding to the remaining quantity may include information on the earliest manufactured date among manufactured dates of the items of the remaining quantity.

Referring back to FIG. 3, in operation S310, the terminal 350 may transmit the information on the removal quantity and the information on the remaining quantity acquired in operation S308 to the electronic apparatus 300. Also, the terminal 350 may transmit the expiration date-related information corresponding to the remaining quantity to the electronic apparatus 300.

Also, the terminal 350 may inquire the operator about whether a tote with the removal quantity is full. When a response indicating that the tote with the removal quantity is full is received from the operator, the terminal 350 may instruct the operator to move the tote to a disposal zone. In contrast, when a response indicating that the tote with the removal quantity is not full is received from the operator, the terminal 350 may output position information of an additional removal target.

In operation S312, the electronic apparatus 300 may update the information on the stock based on the information on the removal quantity and the information on the remaining quantity acquired from the terminal 350. Since the description of operation S240 of FIG. 2 is also applicable to operation S312, redundant description will be omitted.

Figure 9:
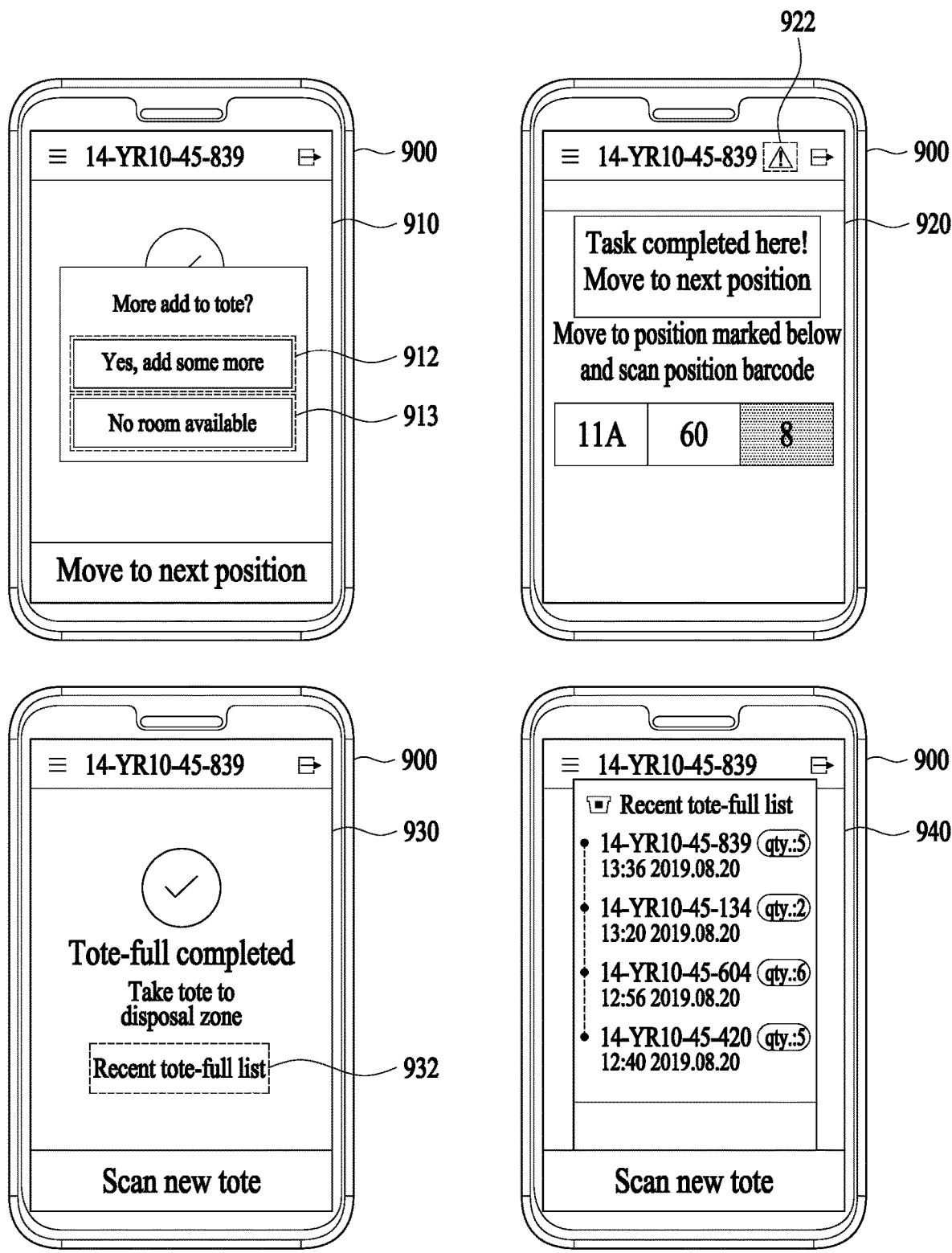
FIG. 9 illustrates a terminal outputting information associated with a tote according to an example embodiment.

FIG. 9 illustrates a terminal outputting information associated with a tote according to an example embodiment.

A terminal 900 may receive information on or regarding a removal quantity and a remaining quantity and expiration date-related information corresponding to the remaining quantity from an operator. Also, the terminal 900 may provide the operator with a menu for selecting whether another removal target item is to be added to a tote. The operator may input information on the removal quantity among an actual quantity of a removal target to the terminal 900, and then add an item of the removal quantity to the tote. For this, the terminal 900 may inquire the operator whether a room for the removal quantity of an additional removal target remains in the tote. For example, the terminal 900 may display an image 910 including menus 912 and 913 for selecting whether another removal target item is to be added to the tote.

When an input of selecting the menu 912 to indicate that another removal target is to be added to the tote is received from the operator, the terminal 900 may output position information of the other the removal target. For example, the terminal 900 may display position information provided to the operator to perform a removal task on the other removal target and display an image 920 for requesting a position barcode to be scanned.

The terminal 900 may provide the operator with a menu 922 for reporting an occurrence of a problem related to scanning of the position barcode. The operator may select the menu 922 to input a problem that the position barcode is damaged or a position is not found, to the terminal 900. Also, information on the problem input to the terminal 900 may be transmitted to an electronic apparatus.

When an input of selecting the menu 913 to indicate that another removal target is not to be added to the tote is received from the operator, the terminal 900 may transmit a message for requesting the fully filled tote to be moved to the disposal zone to the operator. For example, through an image 930, the terminal 900 may transmit the message for requesting the fully filled tote to be moved to the disposal zone to the operator. Also, the terminal 900 may receive, from the operator, an input of selecting a recent tote-full list 932 in the image 930. In this case, the terminal 900 may display an image 940 showing a list of fully filled totes. Through the image 940, the operator may grasp a status of a removal task performed by the operator. For example, when the operator is conducting the removal task using a plurality of totes, the removal task may be performed by distinguishing between a fully filled tote and a partially filled tote based on the image 940.

Figure 10:
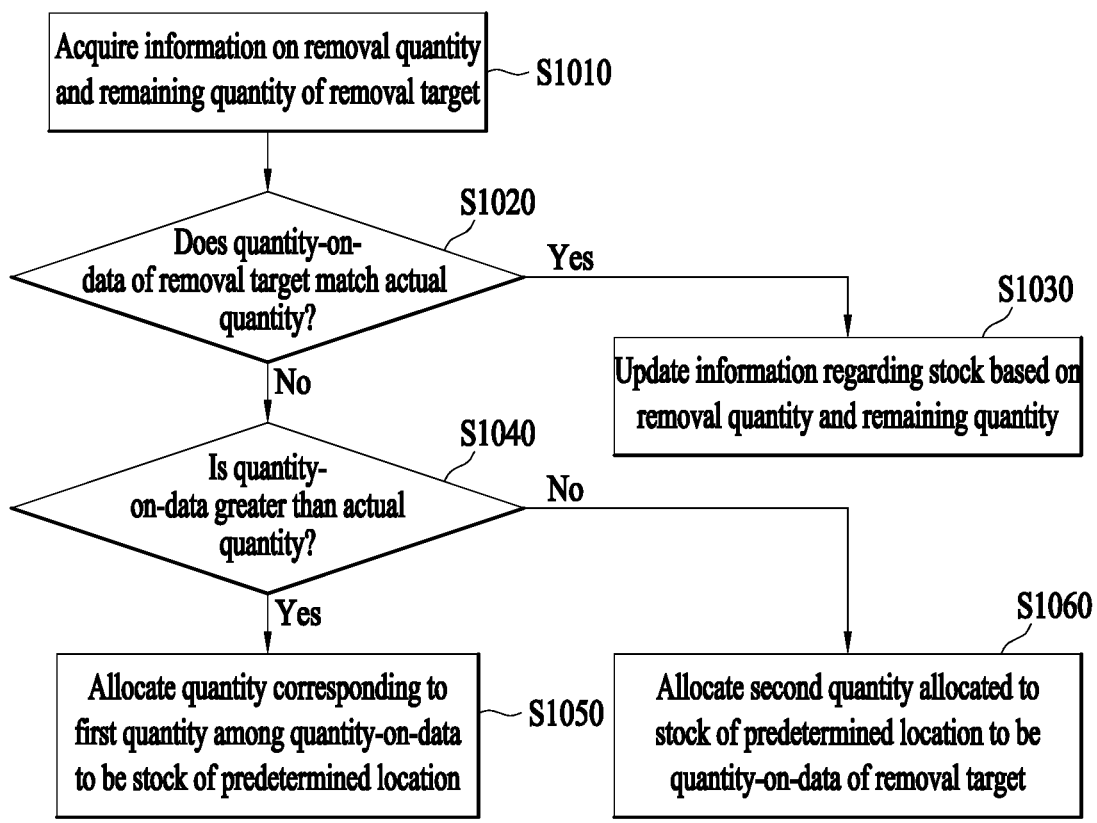
FIG. 10 illustrates an electronic apparatus updating information on stock according to an example embodiment.

FIG. 10 illustrates an electronic apparatus updating information on stock according to an example embodiment.

In operation S1010, the electronic apparatus 100 may acquire information on a removal quantity and a remaining quantity of a removal target from a terminal.

In operation S1020, the electronic apparatus 100 may determine whether a quantity-on-data of the removal target matches an actual quantity which is the removal quantity and the remaining quantity. The quantity-on-data of the removal target may refer to a quantity of an item corresponding to the removal target, which is acquired by the electronic apparatus 100 from data stored in a server. The quantity-on-data may also refer to an item quantity allocated as stock of a predetermined position. For example, the quantity-on-data of the removal target may be an item quantity allocated as stock in a buffer or picking zone.

When it is determined in operation S1020 that the quantity-on-data matches the actual quantity, in operation S1030, the electronic apparatus 100 may update the information on the stock based on the removal quantity and the remaining quantity. Specifically, the electronic apparatus 100 may distinguish the removal quantity and the remaining quantity among the quantity-on-data of the item corresponding to the removal target in the stock. When the remaining quantity is present, the electronic apparatus 100 may store expiration date-related information of the remaining quantity.

The electronic apparatus 100 may update the quantity-on-data of the item corresponding to the removal target with the remaining quantity. In other words, based on a result of a removal task performed on the item that has been the removal target, the electronic apparatus 100 may update a value of the quantity-on-data of the item with a value of the remaining quantity of the item transmitted from a terminal. Also, the electronic apparatus 100 may update expiration date-related information of the item corresponding to the removal target with expiration date-related information of the remaining quantity.

When it is determined in operation S1020 that the quantity-on-data does not match the actual quantity, in operation S1040, the electronic apparatus 100 may determine whether the quantity-on-data is greater than the actual quantity.

When it is determined in operation S1040 that the quantity-on-data is greater than the actual quantity by a first quantity, in operation S1050, the electronic apparatus 100 may allocate a quantity corresponding to the first quantity among the quantity-on-data to be stock of a predetermined location. In other words, the electronic apparatus 100 may cancel an allocation of the first quantity among the quantity-on-data to the removal target and allocate the allocation-canceled first quantity to the stock of the predetermined location. As a result, the electronic apparatus 100 may adjust the quantity-on-data to the actual quantity. For example, the electronic apparatus 100 may allocate the first quantity among the quantity-on-data to be stock of a problem zone.

When it is determined in operation S1040 that the quantity-on-data is less than the actual quantity by a third quantity, in operation S1060, the electronic apparatus 100 may allocate a second quantity allocated to stock of a predetermined location to be the quantity-on-data of the removal target. When the second quantity is the same as the third quantity, the electronic apparatus 100 may additionally allocate the second quantity allocated to the stock of the predetermined location to the quantity-on-data of the removal target, thereby adjusting the quantity-on-data to the actual quantity. When the second quantity is less than the third quantity, the electronic apparatus 100 may allocate the second quantity of the predetermined location to the quantity-on-data of the removal target and additionally allocate a quantity corresponding to a difference between the second quantity and the third quantity to the quantity-on-data of the removal target, thereby adjusting the quantity-on-data to the actual quantity. For example, the electronic apparatus 100 may allocate the second quantity of the problem zone to the quantity-on-data of the removal target.

The electronic apparatus 100 may update the quantity-on-data adjusted to have a value of the actual quantity with the remaining quantity. Also, the electronic apparatus 100 may update the expiration date-related information of the item corresponding to the removal target with the expiration date-related information of the remaining quantity.

FIG. 11 illustrates an electronic apparatus displaying information on stock according to an example embodiment.

The electronic apparatus 100 may display information on stock (hereinafter, also referred to as "stock information") 1100 on a display. The stock information 1100 may be updated based on information on removal quantity and a remaining quantity acquired from a terminal.

The stock information 1100 may include position information 1102 of an item corresponding to a removal target in stock. The stock information 1100 may include identification information 1104 of the item corresponding to the removal target in the stock. The identification information 1104 may include an SKU ID of the item.

The stock information 1100 may include expiration date-related information 1106 of the item corresponding to the removal target, and may include information 1108 on a quantity-on-data of the item corresponding to the removal target.

The stock information 1100 may include identification information 1110 of an operator performing a removal task on the removal target, information 1112 on the removal quantity and remaining quantity based on a result of the removal task, and information 1114 on a removal task completion date. Also, the stock information 1100 may include information 1116 on an error occurring while the removal task is performed by the operator.

Figure 12:
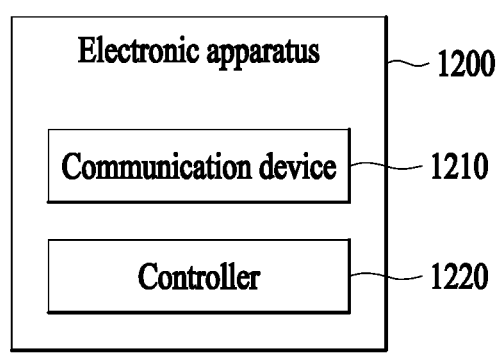
FIG. 12 is a block diagram illustrating an electronic apparatus.

FIG. 12 is a block diagram illustrating an electronic apparatus.

An electronic apparatus 1200 may include a communication device 1210 and a controller 1220 according to an example embodiment. FIG. 12 illustrates only components of the electronic apparatus 1200 related to the present embodiment. However, it will be understood by those skilled in the art that other general-purpose components may be further included in addition to the components illustrated in FIG. 12. Since the description of the electronic apparatuses 100 and 300 is also applicable to the electronic apparatus 1200, redundant description will be omitted.

The communication device 1210 may be a device for performing wireless communication and may communicate with an external electronic apparatus. The external electronic apparatus may be a terminal or a server. Also, the communication device 1210 may use communication technologies such as global system for mobile communication (GSM), code division multi access (CDMA), long term evolution (LTE), 5G, wireless LAN (WLAN), Wi-Fi, Bluetooth™, radio frequency identification (RFID), IrDA communication, ZigBee, and NFC, for example.

The controller 1220 may control an overall operation of the electronic apparatus 1200 and process data and a signal. The controller 1220 may include at least one hardware unit. In addition, the controller 1220 may operate through at least one software module generated by executing program codes stored in a memory. The controller 1220 may include a processor and a memory so the processor executes program codes stored in the memory, thereby controlling an overall operation of the electronic apparatus 1200 and processing data and a signal.

The controller 1220 may recognize an item as a removal target based on expiration date-related information of the item.

The controller 1220 may determine whether each item in the stock is the removal target in at least one of a case in which a management type of the item is changed, a case in which expiration date-related information of the item is changed, a case in which a position of the item is changed, and a case in which a release or stock transfer allocation of the item is canceled.

When the item is an item managed by expiration date, the controller 1220 may determine whether the item is the removal target based on an expiration date and a shelf life of the item. When the item is an item managed by manufactured date, the controller 1220 may determine whether the item is the removal target based on a manufactured date and the shelf life of the item.

When the expiration date-related information of the item is absent, the controller 1220 may recognize the item as the removal target.

The controller 1220 may control the communication device 1210 to transmit information on the removal target to a terminal. From the terminal, the controller 1220 may receive information on a removal quantity to be removed from the stock among an actual quantity of the removal target, and information on a remaining quantity other than the removal quantity among the actual quantity of the removal target. The terminal may provide the information on the removal target to an operator and receive the information on the removal quantity and the information on the remaining quantity from the operator through a GUI.

The controller 1220 may control the communication device 1210 to acquire expiration date-related information corresponding to the remaining quantity. The terminal may receive the expiration date-related information corresponding to the remaining quantity from the operator through the GUI.

The controller 1220 may update the information on the stock based on the information on the removal quantity and the information on the remaining quantity. The controller 1220 may update the information on the stock based on the expiration date-related information corresponding to the remaining quantity.

When a quantity-on-data of the removal target does not match the actual quantity, the controller 1220 may adjust the quantity-on-data based on the actual quantity. When the quantity-on-data is greater than the actual quantity by a first quantity, the controller 1220 may allocate the first quantity among the quantity-on-data to be stock of a predetermined location. When the quantity-on-data is less than the actual quantity by a second quantity, the controller 1220 may allocate a third quantity allocated to the stock of the predetermined location, to the quantity-on-data of the removal target. When the third quantity is less than the second quantity, the controller 1220 may additionally allocate a quantity corresponding to a difference between the second quantity and the third quantity to the quantity-on-data of the removal target.

The controller 1220 may provide at least one of expiration date-related information, position information, information on a removal quantity and a remaining quantity, and information on an operator of each removal target through a display of the electronic apparatus 1200.

Figure 13:
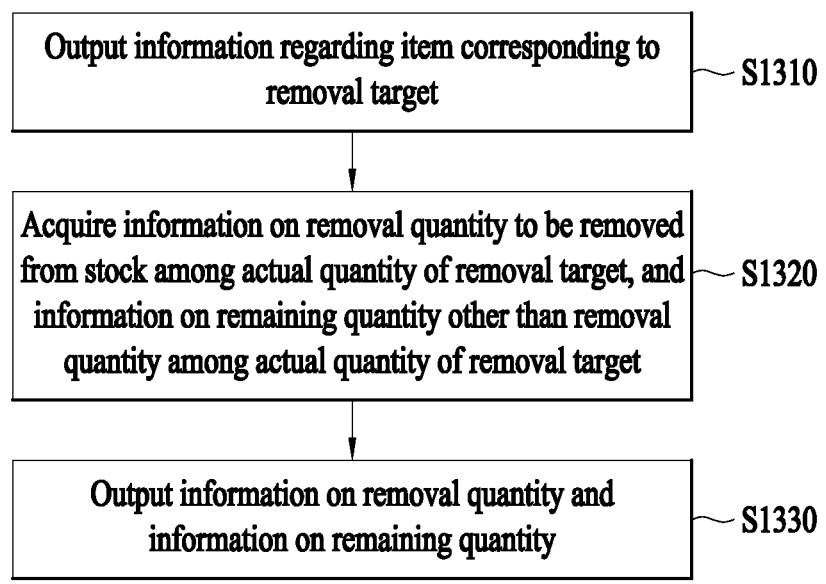
FIG. 13 is a method of operating a terminal according to an example embodiment.

FIG. 13 illustrates a method of operating a terminal according to an example embodiment.

In operation S1310, the terminal 200 may output information on or regarding an item corresponding to a removal target. For example, the terminal 200 may output the information on the item corresponding to the removal target through a display. The terminal 200 may receive the information on the item corresponding to the removal target through a communication device. The terminal 200 may include a controller. The controller of the terminal 200 may control the display to output the information on the item corresponding to the removal target.

In operation S1320, the terminal 200 may acquire information on a removal quantity to be removed from stock among an actual quantity of the removal target, and information on a remaining quantity other than the removal quantity among the actual quantity of the removal target. For example, the terminal 200 may acquire the information on the removal quantity and the information on the remaining quantity through an input device in the terminal 200. Since the terminal 200 includes the controller, the controller of the terminal 200 may control the input device to acquire the information on the removal quantity and the information on the remaining quantity.

In operation S1330, the terminal 200 may output the information on the removal quantity and the information on the remaining quantity. For example, the terminal 200 may output the information on the removal quantity and the information on the remaining quantity through the display. The terminal 200 may transmit the information on the removal quantity and the information on the remaining quantity through the communication device to the external electronic apparatus. Since the terminal 200 includes the controller, the controller of the terminal 200 may control the communication device to transmit the information on the removal quantity and the information on the remaining quantity to the external electronic apparatus.

The devices in accordance with the above-described embodiments may include a processor, a memory which stores and executes program data, a permanent storage such as a disk drive, a communication port for communication with an external device, and a user interface device such as a touch panel, a key, and a button. Methods realized by software modules or algorithms may be stored in a computer-readable recording medium as computer-readable codes or program commands which may be executed by the processor. Here, the computer-readable recording medium may be a magnetic storage medium (for example, a read-only memory (ROM), a random-access memory (RAM), a floppy disk, or a hard disk) or an optical reading medium (for example, a CD-ROM or a digital versatile disc (DVD)). The computer-readable recording medium may be dispersed to computer systems connected by a network so that computer-readable codes may be stored and executed in a dispersion manner. The medium may be read by a computer, may be stored in a memory, and may be executed by the processor.

The present embodiments may be represented by functional blocks and various processing steps. These functional blocks may be implemented by various numbers of hardware and/or software configurations that execute specific functions. For example, the present embodiments may adopt direct circuit configurations such as a memory, a processor, a logic circuit, and a look-up table that may execute various functions by control of one or more microprocessors or other control devices. Similarly to that elements may be executed by software programming or software elements, the present embodiments may be implemented by programming or scripting languages such as C, C++, Java, and assembler including various algorithms implemented by combinations of data structures, processes, routines, or of other programming configurations. Functional aspects may be implemented by algorithms executed by one or more processors. In addition, the present embodiments may adopt the related art for electronic environment setting, signal processing, and/or data processing, for example. The terms "mechanism", "element", "means", and "configuration" may be widely used and are not limited to mechanical and physical components. These terms may include meaning of a series of routines of software in association with a processor, for example.

The above-described embodiments are merely examples and other embodiments may be implemented within the scope of the following claims.

What is claimed is:

1. A method operable by an electronic apparatus for management of stock in a fulfillment center, the method comprising:
    determining, by the electronic apparatus, that expiration date-related information of an item of the stock satisfies one or more conditions;
    identifying, by the electronic apparatus, the item as a target for removal from the stock in the fulfillment center based on determining that the expiration date-related information of the item satisfies the one or more conditions, wherein quantity information of the item identifies a quantity-on-data of the item within the stock;
    transmitting, by the electronic apparatus to a mobile terminal, information identifying the item as the target for removal and a removal task command, wherein, in response to the removal task command, the mobile terminal displays, via a user interface of the mobile terminal, at least a portion of the information identifying the item as the target for removal;
    in response to the removal task command, acquiring, by the electronic apparatus from the user interface of the mobile terminal, information regarding a removal quantity of an actual quantity of the item to be removed from the stock in the fulfillment center, information regarding a remaining quantity of the actual quantity of the item to be maintained within the stock in the fulfillment center, and expiration date-related information of the remaining quantity of the actual quantity of the item; and
    updating, by the electric apparatus, the quantity information of the item based at least in part on the remaining quantity of the actual quantity of the item to generate updated quantity information and the expiration date-related information of the item based at least in part on the expiration date-related information of the remaining quantity of the actual quantity of the item to generate updated expiration date-related information of the item, wherein the updated quantity information identifies the removal quantity of the actual quantity of the item is removed from the stock in the fulfillment center and the remaining quantity of the actual quantity of the item is maintained within the stock in the fulfillment center,
    wherein, in response to the quantity-on-data of the item being greater or less than the actual quantity of the item, the updating comprises adjusting the quantity-on-data based on the actual quantity,
    wherein, in response to the quantity-on-data of the item being greater than the actual quantity of the item by a first quantity, the updating comprises allocating the first quantity of the quantity-on-data as stock of a predetermined location, and
    wherein, in response to the quantity-on-data of the item being less than the actual quantity of the item by a second quantity, the updating comprises allocating a third quantity allocated as the stock of the predetermined location to the quantity-on-data of the item.

2. The method of claim 1, wherein the mobile terminal is configured to:
    provide, to an operator via the user interface, the at least a portion of the information identifying the item as the target for removal; and
    receive, from the operator via the user interface, the information regarding the removal quantity and the information regarding the remaining quantity.

3. The method of claim 2, wherein:
    the mobile terminal is configured to receive, from the operator through the user interface, the expiration date-related information of the remaining quantity,
    wherein the expiration date-related information of the item identifies that:
        the item is managed by expiration date, the expiration date-related information of the item comprising an earliest expiration date of one or more expiration dates of the remaining quantity of the actual quantity of the item, or
        the item is managed by manufactured date, the expiration date-related information of the item comprising an earliest manufactured date of one or more manufactured dates of the remaining quantity of the actual quantity of the item.

4. The method of claim 1, wherein the third quantity is less than the second quantity, wherein the updating of the quantity information of the item and the expiration date-related information of the item comprises additionally allocating a quantity corresponding to a difference between the second quantity and the third quantity to the quantity-on-data of the item.

5. The method of claim 1, wherein the identifying, by the electronic apparatus, of the item as the target for removal comprises determining whether each item of a plurality of items of the stock is a particular target for removal by determining whether a management type of the particular item is changed, corresponding expiration date-related information of the particular item is changed, a position of the particular item is changed, or a release or stock transfer allocation of the particular item is canceled.

6. The method of claim 1, wherein:
the expiration date-related information of the item identifies that the item is managed based on an expiration date, wherein the identifying, by the electronic apparatus, of the item as the target for removal comprises determining the item is the target for removal based on the expiration date and a shelf life of the item, or
the expiration date-related information of the item identifies that the item is managed based on a manufactured date, wherein the identifying, by the electronic apparatus, of the item as the target for removal comprises determining the item is the target for removal based on the manufactured date and the shelf life of the item.

7. The method of claim 1, wherein determining, by the electronic apparatus, that the expiration date-related information of the item of the stock satisfies one or more conditions comprises determining that the expiration date-related information of the item is absent.

8. The method of claim 1, further comprising:
providing at least one of expiration date-related information, position information, information regarding a removal quantity and a remaining quantity, or information regarding an operator of each item of a plurality of items.

9. The method of claim 1, wherein the information identifying the item as the for removal target comprises at least one of position information, identification information, or removal criterion information of the item.

10. A non-transitory computer readable recording medium comprising a computer program for performing the operation method of claim 1.

11. An electronic apparatus for stock management, the apparatus comprising:
a communication device; and
a controller,
wherein the controller is configured to:
determine that expiration date-related information of an item of the stock satisfies one or more conditions;
identify the item as a target for removal from the stock in the fulfillment center based on determining that the expiration date-related information of the item satisfies the one or more conditions, wherein quantity information of the item identifies a quantity-on-data of the item within the stock;
transmit, via the communication device to a mobile terminal, information identifying the item as the target for removal and a removal task command, wherein, in response to the removal task command, the mobile terminal displays, via a user interface of the mobile terminal, at least a portion of the information identifying the item as the target for removal;
in response to the removal task command, acquire, via the communication device from the user interface of the mobile terminal, information regarding a removal quantity of an actual quantity of the item to be removed from the stock in the fulfillment center, information regarding a remaining quantity of the actual quantity of the item to be maintained within the stock in the fulfillment center, and expiration date-related information of the remaining quantity of the actual quantity of the item; and
update the quantity information of the item based at least in part on the remaining quantity of the actual quantity of the item to generate updated quantity information and the expiration date-related information of the item based at least in part on the expiration date-related information of the remaining quantity of the actual quantity of the item to generate updated expiration date-related information of the item, wherein the updated quantity information identifies the removal quantity of the actual quantity of the item is removed from the stock in the fulfillment center and the remaining quantity of the actual quantity of the item is maintained within the stock in the fulfillment center,
wherein to update the quantity information of the item, the controller is further configured to, in response to the quantity-on-data of the item being greater or less than the actual quantity of the item, adjust the quantity-on-data based on the actual quantity,
wherein to update the quantity information of the item, the controller is further configured to, in response to the quantity-on-data of the item being greater than the actual quantity of the item by a first quantity, allocate the first quantity of the quantity-on-data as stock of a predetermined location, and
wherein to update the quantity information of the item, the controller is further configured to, in response to the quantity-on-data of the item being less than the actual quantity of the item by a second quantity, allocate a third quantity allocated as the stock of the predetermined location, to the quantity-on-data of the item.

* * * * *